United States Patent
Shen

(10) Patent No.: US 9,971,546 B2
(45) Date of Patent: May 15, 2018

(54) METHODS FOR SCHEDULING READ AND WRITE COMMANDS AND APPARATUSES USING THE SAME

(71) Applicant: Silicon Motion, Inc., Jhubei (TW)

(72) Inventor: Yang-Chih Shen, Taipei (TW)

(73) Assignee: Silicon Motion, Inc., Jhubei (TW)

( * ) Notice: Subject to any disclaimer, the term of this patent is extended or adjusted under 35 U.S.C. 154(b) by 36 days.

(21) Appl. No.: 15/220,739

(22) Filed: Jul. 27, 2016

(65) Prior Publication Data
US 2017/0060427 A1    Mar. 2, 2017

(30) Foreign Application Priority Data

Sep. 1, 2015  (TW) .............................. 104128765 A

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
CPC ....... G06F 3/0659; G06F 3/061; G06F 3/0679
See application file for complete search history.

(56) References Cited

U.S. PATENT DOCUMENTS

| | | | |
|---|---|---|---|
| 7,188,219 B2 * | 3/2007 | Jeddeloh | ............. G06F 13/1642 710/310 |
| 7,644,248 B2 | 1/2010 | Subashchandrabose et al. | |
| 2005/0204093 A1 * | 9/2005 | Rotithor | .............. G06F 12/0215 711/105 |
| 2008/0059672 A1 * | 3/2008 | Irish | ........................ G06F 13/36 710/116 |
| 2012/0159016 A1 * | 6/2012 | Morita | ................ G06F 13/1673 710/33 |
| 2014/0068203 A1 | 3/2014 | Son et al. | |
| 2014/0223111 A1 * | 8/2014 | Dinkjian | ................. G06F 12/00 711/147 |

FOREIGN PATENT DOCUMENTS

TW          201516681 A     5/2015

OTHER PUBLICATIONS

Office Action of corresponding TW application, published on Oct. 17, 2016.

* cited by examiner

*Primary Examiner* — Midys Rojas
*Assistant Examiner* — Khoa D Doan
(74) *Attorney, Agent, or Firm* — Wang Law Firm, Inc.

(57) ABSTRACT

A method for scheduling read and write commands, performed by a processing unit, including at least the following steps: the processing unit obtains more than one read commands from a read queue successively and executes the obtained read commands until a first condition is met. After the first condition is met, the processing unit obtains more than one write commands from a write queue successively and executes the obtained write commands until a second condition is met.

19 Claims, 8 Drawing Sheets

METHODS FOR SCHEDULING READ AND WRITE COMMANDS AND APPARATUSES USING THE SAME

CROSS REFERENCE TO RELATED APPLICATIONS

This Application claims priority of Taiwan Patent Application No. 104128765, filed on Sep. 1, 2015, the entirety of which is incorporated by reference herein.

BACKGROUND

Technical Field

The present invention relates to flash memory, and in particular to methods for scheduling read and write commands and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal. Accordingly, what is needed are methods for scheduling read and write commands and apparatuses that use these methods to improve the efficiency of data read and write.

BRIEF SUMMARY

An embodiment of the invention introduces a method for scheduling read and write commands, performed by a processing unit, including at least the following steps. The processing unit obtains more than one read commands from a read queue successively and executes the obtained read commands until a first condition is met. After the first condition is met, the processing unit obtains more than one write commands from a write queue successively and executes the obtained write commands until a second condition is met.

An embodiment of the invention introduces an apparatus for scheduling read and write commands including at least a read queue, a write queue and a processing unit. The processing unit, coupled to the read queue and the write queue, obtains more than one read commands from the read queue successively and executes the obtained read commands until a first condition is met; and, after the first condition is met, obtains more than one write commands from the write queue successively and executes the obtained write commands until a second condition is met.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
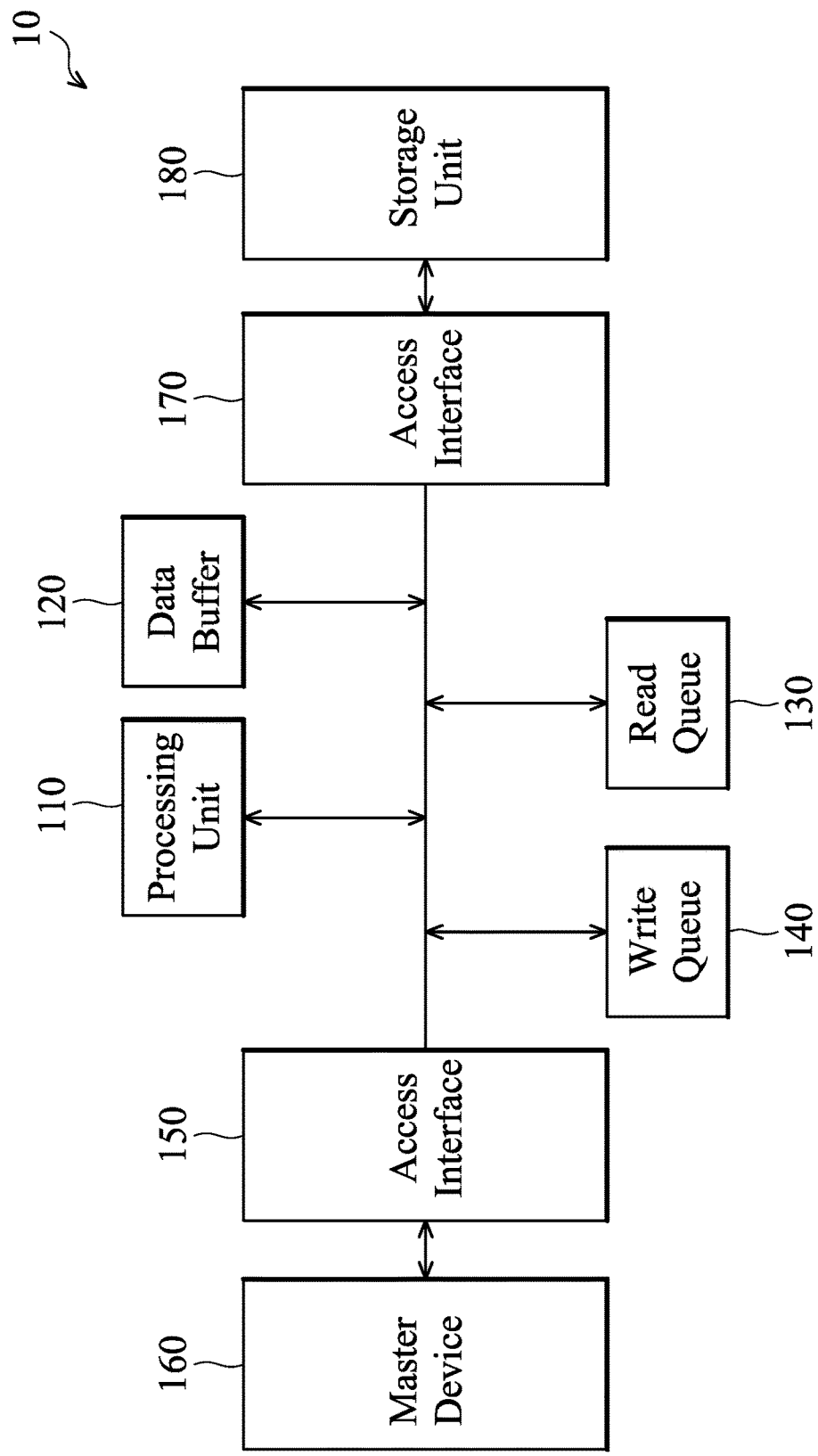
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with other electronic devices through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
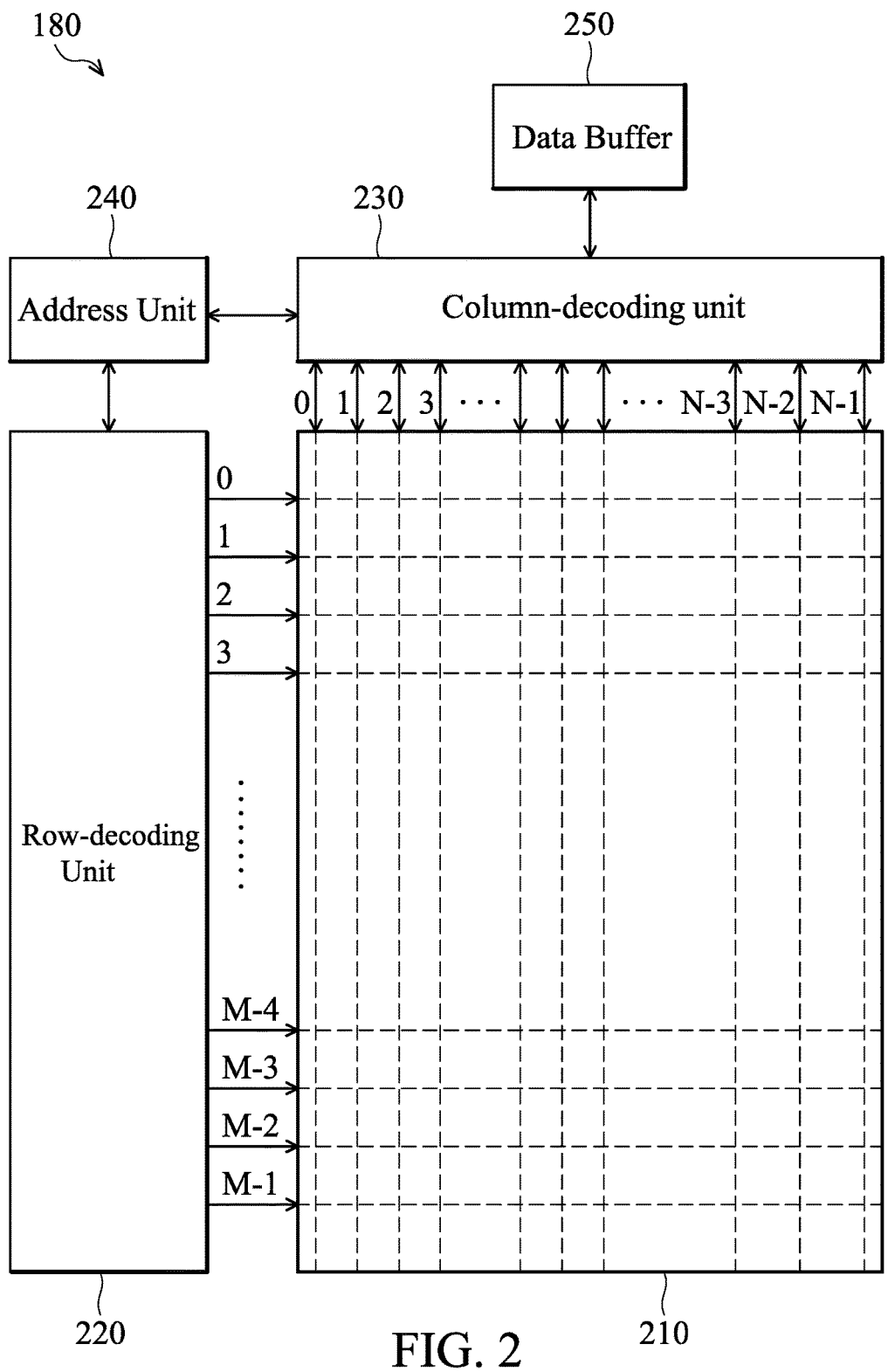
FIG. 2 shows a schematic diagram depicting a storage unit of a flash memory according to an embodiment of the invention n.

FIG. 2 shows a schematic diagram depicting a storage unit of a flash memory according to an embodiment of the invention. A storage unit 180 includes an array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

Figure 3:
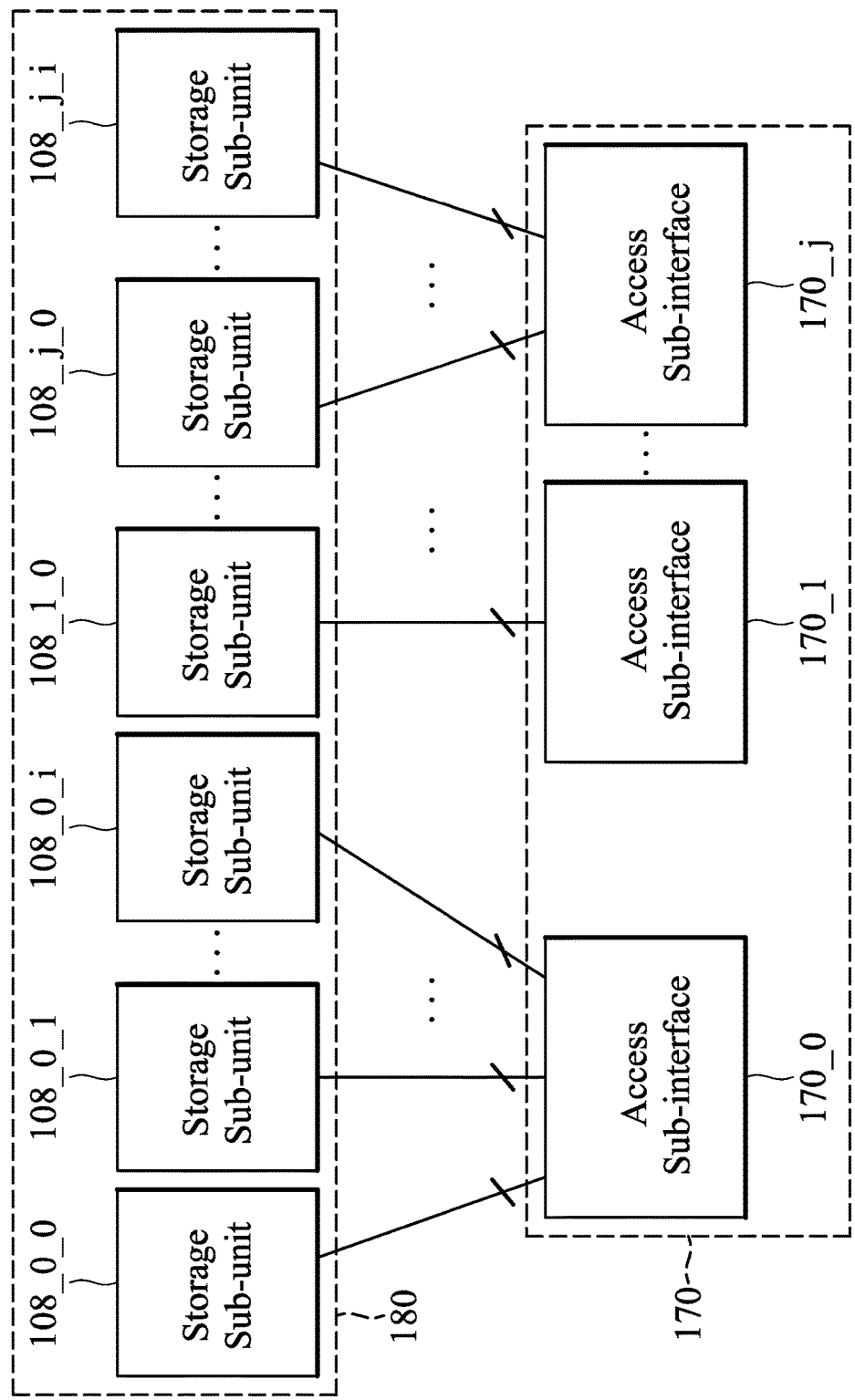
FIG. 3 is a schematic diagram illustrating interfaces to storage units of a flash storage according to an embodiment of the invention.

The storage unit 180 may contain multiple storage sub-units and each storage sub-unit may be practiced in a single die and use an access sub-interface to communicate with the processing unit 110. FIG. 3 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The control unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface.

Figure 4A:
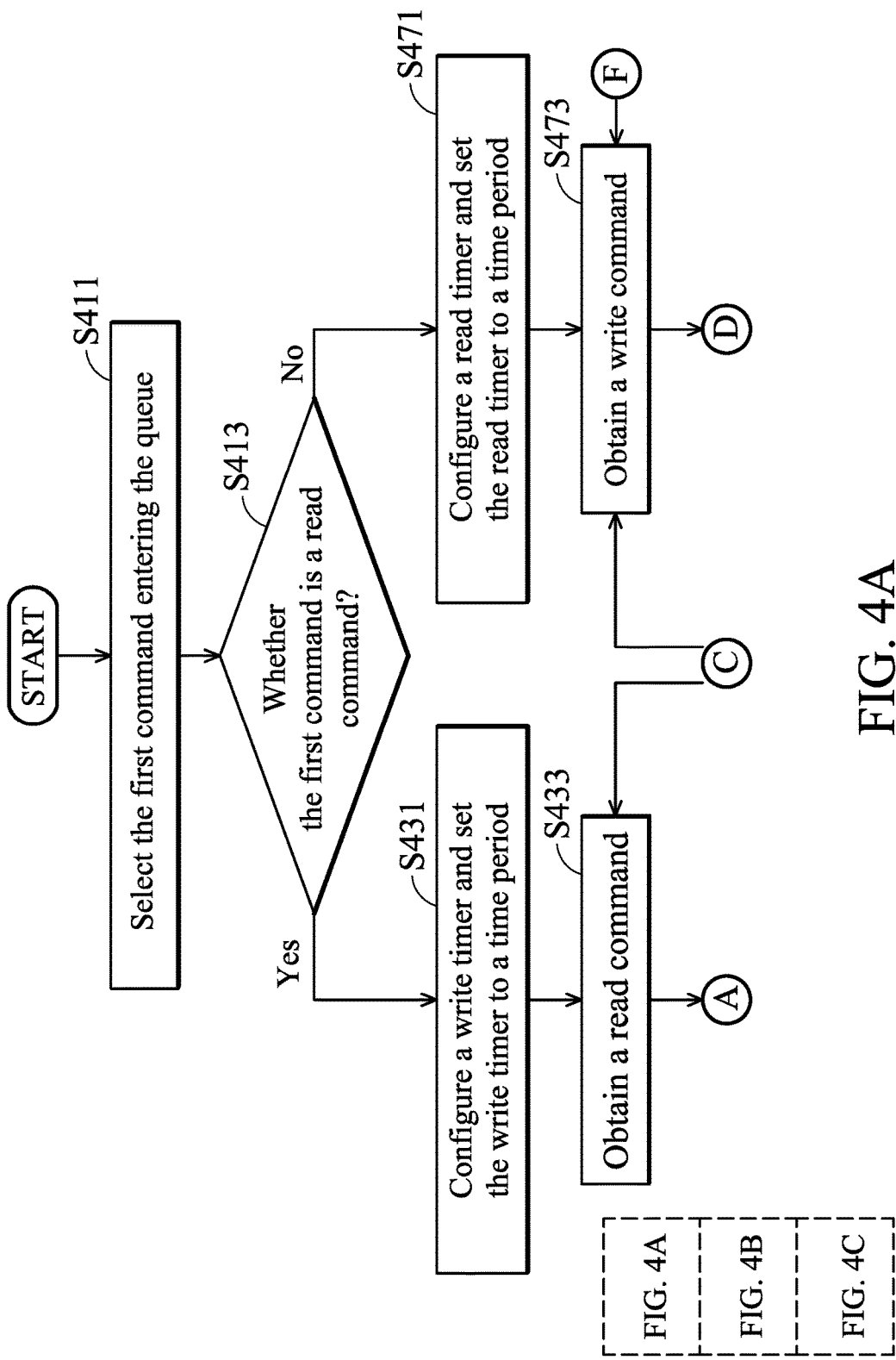
FIGS. 4A to 4C are flowcharts illustrating a method for scheduling read and write commands according to an embodiment of the invention.
Figure 4B:
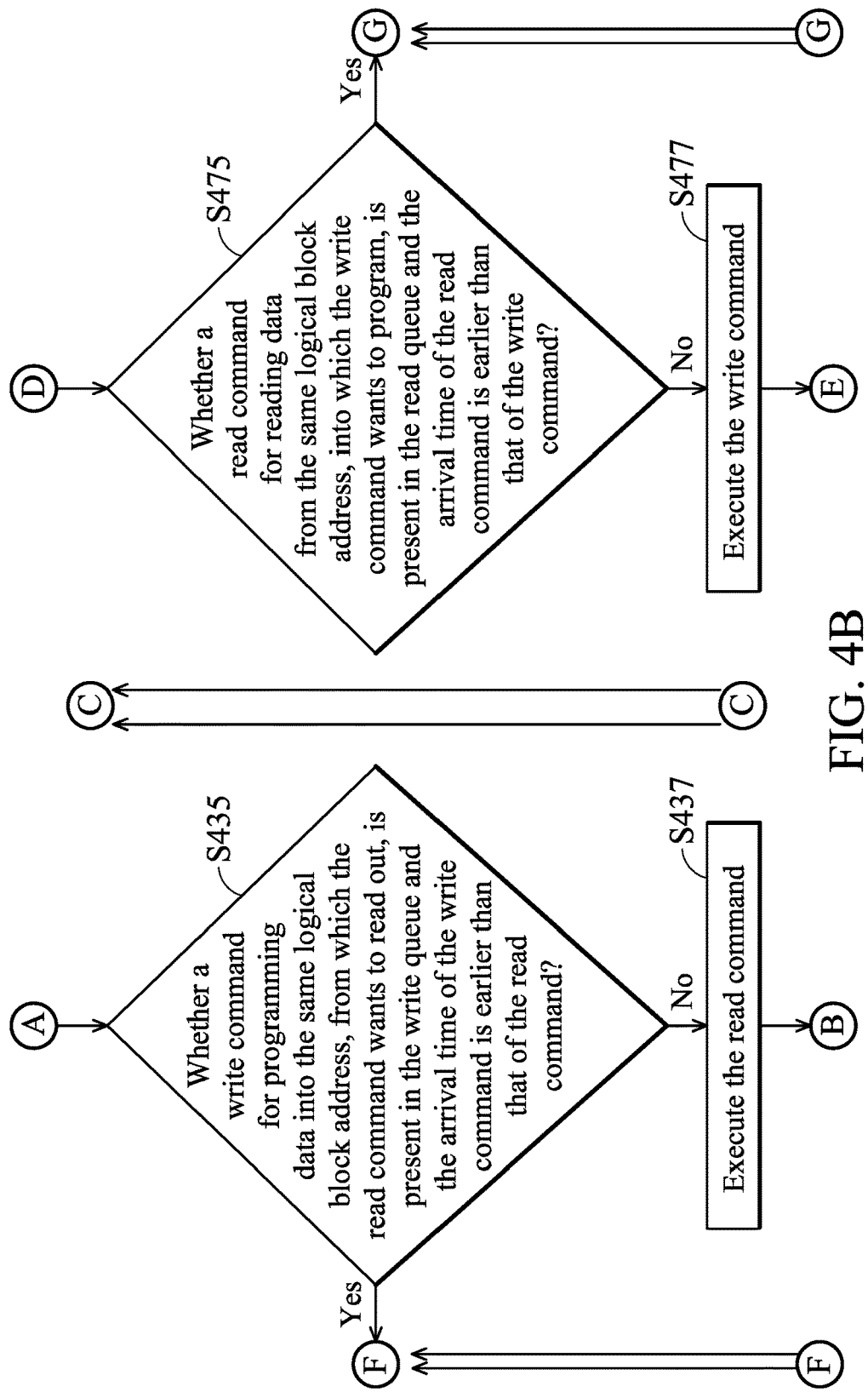
Figure 4C:
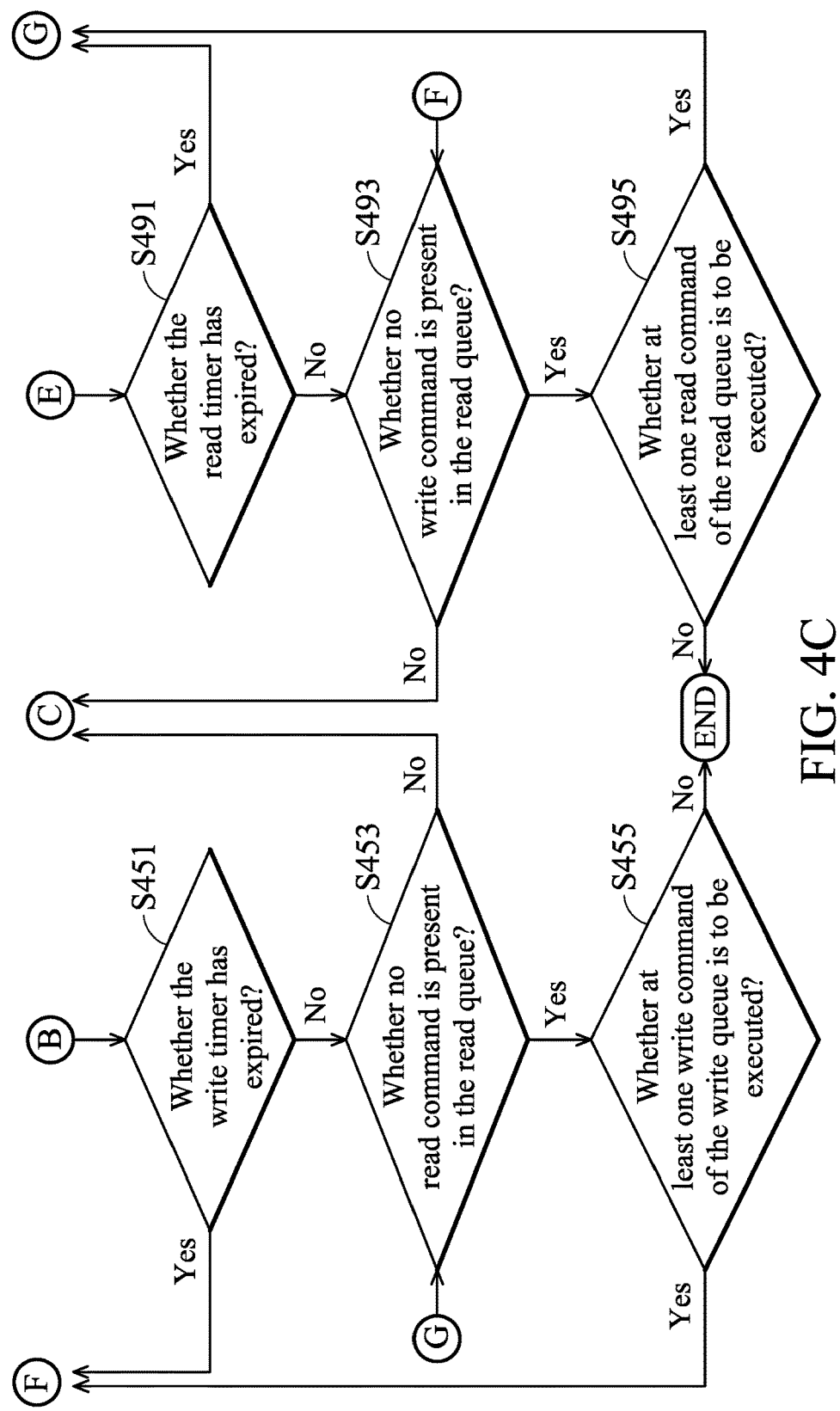

A master device 160 may provide an LBA (Logical Block Address) to the processing unit 110 through the access interface 150 to indicate a particular region for data to be read from or written into. The read commands and the write commands are stored in the read queue 130 and the write queue 140 in sequence with respect to their arrival times. In order to optimize the data read and write efficiency, the access interface 170 schedules theses commands to form continuous reads or writes, rather than with respect to their arrival times. FIGS. 4A to 4C are flowcharts illustrating a method for scheduling read and write commands according to an embodiment of the invention. The whole process begins with a receipt of at least one read or write command after a period of idle time. During the execution of the process, all read and write commands received from the host device 160 via the access interface 150 are respectively stored in the read queue 130 and the write queue 140 in sequence with respect to their arrival times. The processing unit 110 selects the first command entering the queue (step S411). Next, it is determined whether the first command is a read command (step S413). When the first command is a read command (the "Yes" path of step S413), the process repeatedly performs a loop for attempting to execute several read commands of the read queue 130 until a specific condition is met (steps S431 to S455). It should be noted that, before the specific condition is met, the arrival times of the executed read commands may be later than that of one or more write commands of the write queue 140. On the other hand, when the first command is a write command (the "No" path of step S413), the process repeatedly performs a loop for attempting to execute several write commands of the write queue 140 until a specific condition is met (steps S471 to S495). It should be noted that, before the specific condition is met, the arrival times of the executed write commands may be later than that of one or more read commands of the read queue 130.

Figure 5:
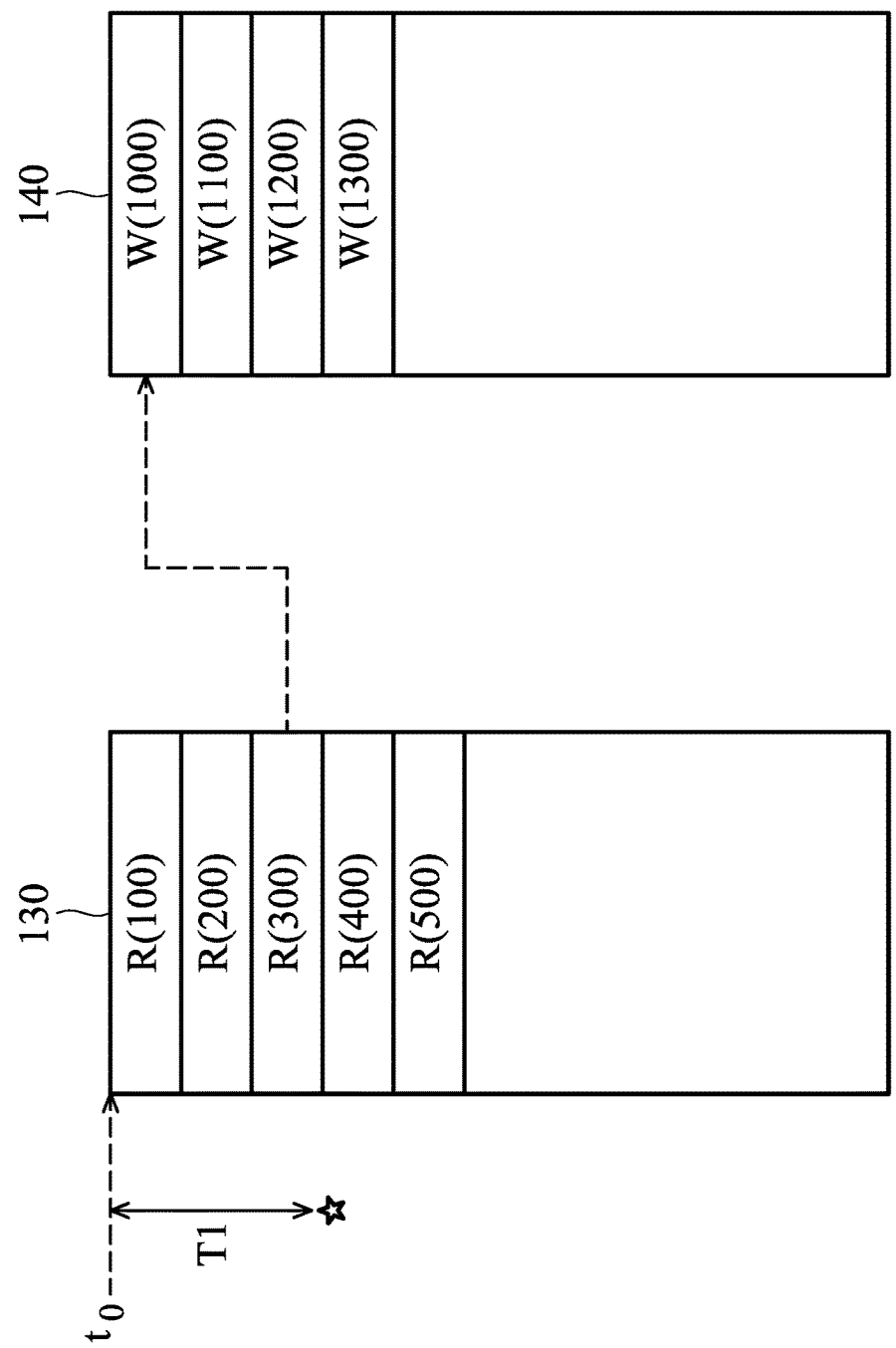
FIG. 5 is a schematic diagram for executing read and write commands according to an embodiment of the invention.

The loop for executing read commands contains at least three determinations whether the execution of read commands ends and the process starts to execute one or more write commands. The first decision is used to limit the execution of successive read commands to the time interval associated with tolerable waiting time of a write command. If an arrived write command has not been executed after the tolerable waiting time, the host device 160 will consider that a write error occurs and retransmit the write command. In the beginning of entering the loop, the processing unit 110 configures a write timer and sets the write timer to a time period for the tolerable waiting time associated with the write command (step S431). It should be noted that, after the write timer has reached the set time period, the processing unit 110 will be notified that the write timer has expired. The notification may be a signal sent to the processing unit 110 or a setting of a register that can be read by the processing unit 110. After executing the read command of the read queue 130 (step S437), the processing unit 110 determines whether the write timer has expired (step S451). If so, the process exits the loop for executing read commands and attempts to obtain and execute a write command of the write queue 140 (steps S493, S473 and S477). FIG. 5 is a schematic diagram for executing read and write commands according to an embodiment of the invention. Assume that the read queue 130 stores five read commands and the write queue 140 stores four write commands, where, for each command, the quoted number indicates its associated logical block address: The processing unit 110 configures a write timer at the moment $t_0$ and sets a time period T1. After executing commands for reading data from the logical bock addresses 100, 200 and 300 continuously (step S437), the processing unit 110 detects that the write timer has expired (the "Yes" path of step S451). Subsequently, the processing unit 110 starts to execute the command for programming data into the logical block address 1000 and, if feasible, the following commands.

Figure 6:
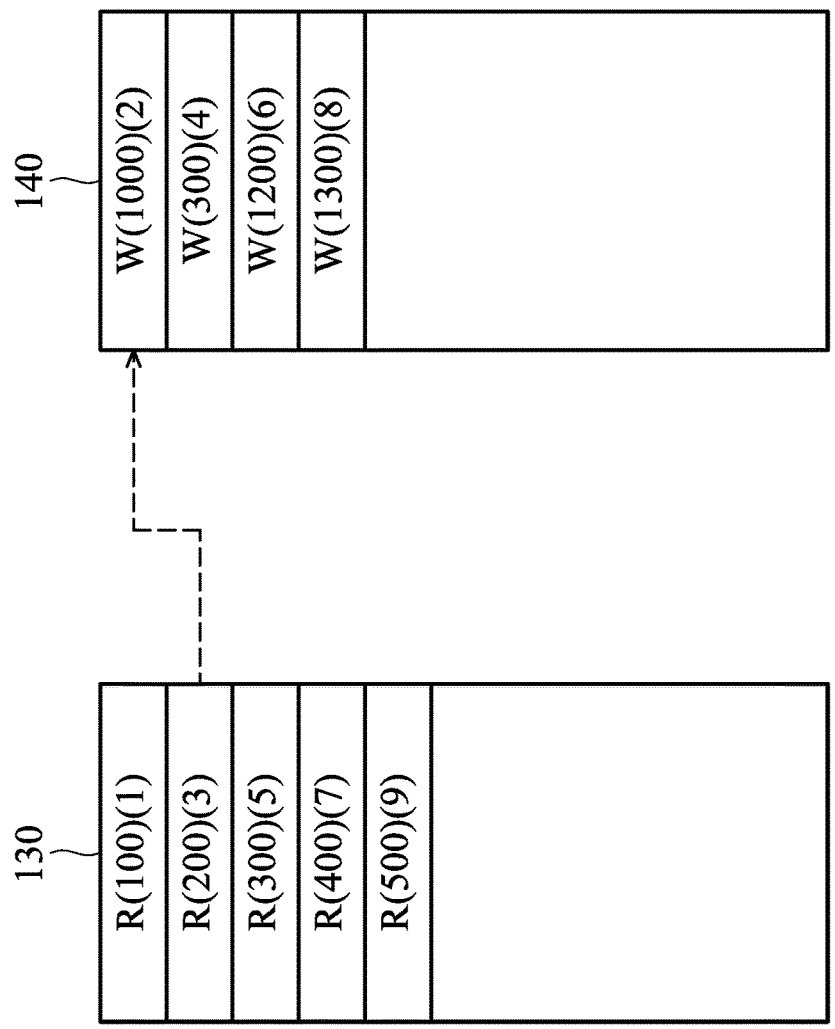
FIG. 6 is a schematic diagram for executing read and write commands according to an embodiment of the invention.

The second decision is used to avoid a dirty read. The dirty read means that the host device 160 issues commands to write data into a logical block address and then read out data from the same logical block address, however, the processing unit 110 executes the commands conversely to cause an error of reading out data, which has not been updated. Or, the dirty read means that the host device 160 issues commands to read out data from a logical block address and then write data into the same logical block address, however, the processing unit 110 executes the commands conversely to cause an error of reading out data, which has been overwritten. In order to avoid the dirty read, after obtaining a read command (step S433), the processing unit 110 determines whether a write command for programming data into the same logical block address, from which the read command wants to read out, is present in the write queue 140 and the arrival time of the write command is earlier than that of the read command (step S435). If so, the process exits the loop for executing read commands and attempts to obtain and execute a write command of the write queue 140 (steps S493, S473 and S477). FIG. 6 is a schematic diagram for executing read and write commands according to an embodiment of the invention. Assume that the read queue 130 stores five read commands and the write queue 140 stores four write commands, where, for each command, the first quoted number indicates its associated logical block address and the second quoted number indicates its arrival time (a smaller number indicates an earlier time): After executing commands for reading data from the logical block addresses 100 and 200 (step S437), the processing unit 110 detects that a write command for programming data into the same logical block address 300, from which the read command wants to read out, is present in the write queue 140, and the arrival time of the write command is earlier than that of the read command (the "Yes" path of step S435). Subsequently, the process starts to execute the write command for programming data into the logical block address 1000 and the following command(s) (step S473).

In addition, when detecting that no read command is present in the read queue 130 and at least one write command of the write queue 140 is to be executed (the "Yes" path of step S455 following the "Yes" path of step S453), the process exits the loop for executing read commands and attempts to obtain and execute a write command of the write queue 140 (steps S493, S473 and S477). In step S437, the processing unit 110 directs the access interface 170 to read data from a designated logical block address of the storage unit 180 and store in the data buffer 120, and directs the access interface 150 to read data from the data buffer 120 and reply with the data to the host device 160. It should be noted that, once the read command is executed successfully (step S437), the read command is removed from the read queue 130.

Similarly, the loop for executing write commands contains at least three determinations whether the execution of write commands ends and the process starts to execute one or more read commands. In the beginning of entering the loop, the processing unit 110 configures a read timer and sets the read timer to a time period for the tolerable waiting time associated with the read command (step S471). The design of the read timer is similar with that of the write timer. Details of the read timer may refer to the description of the write timer and are omitted for brevity. The time period of the read timer may be the same as or different from that of the write timer. After executing a write command of the write queue 140 (step S477), it is determined whether the read timer has expired (step S491). If so, the process exits the loop for executing write commands and attempts to obtain and execute a read command of the read queue 130 (steps S453, S433 and S437). In order to avoid a dirty read, after obtaining a write command (step S473), it is determined whether a read command for reading data from the same logical block address, into which the write command wants to program, is present in the read queue 130 and the arrival time of the read command is earlier than that of the write command (step S475). If so, the process exits the loop for executing write commands and attempts to obtain and execute a read command of the read queue 130 (steps S453, S433 and S437). In addition, when detecting that no write command is present in the write queue 140 and at least one read command of the read queue 130 is to be executed (the "Yes" path of step S495 following the "Yes" path of step S493), the process exits the loop for executing write commands and attempts to obtain and execute a read command of the read queue 130 (steps S453, S433 and S437). In step S477, the processing unit 110 directs the access interface 170 to program data into a designated logical block address of the storage unit 180. It should be noted that, once the write command is executed successfully (step S477), the write command is removed from the write queue 140.

Although the embodiment has been described as having specific elements in FIGS. 1 to 3, it should be noted that additional elements may be included to achieve better performance without departing from the spirit of the invention. While the process flow described in FIGS. 4A to 4C includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for scheduling read and write commands, performed by a processing unit, comprising:
 configuring a write timer and setting the write timer to a time period for a tolerable waiting time associated with write commands;
 obtaining more than one read commands from a read queue successively and executing the obtained read commands for reading data from a storage unit via an access interface until a first condition is met;
 after executing each read command, determining whether the write timer has reached the time period;
 determining that the first condition is met when the write timer has reached the time period; and
 after the first condition is met, obtaining more than one of the write commands from a write queue successively and executing the obtained write commands for programming data into the storage unit via the access interface until a second condition is met.

2. The method of claim 1, further comprising:
 obtaining the read commands and the write commands from a host device via an access interface;
 storing the read commands in the read queue in sequence with respect to their arrival times; and
 storing the write commands in the write queue in sequence with respect to their arrival times.

3. The method of claim 1, wherein the write timer notifies the processing unit that the write timer has reached the time period.

4. The method of claim 1, further comprising:
 before executing each read command, determining whether any of the write commands for programming data into the same logical block address, from which the read command wants to read out, is present in the write queue and an arrival time of the write command is earlier than that of the read command; and if so, the first condition is met.

5. The method of claim 1, further comprising:

the first condition is met when detecting that no read command is present in the read queue and at least one write command of the write queue is to be executed.

6. The method of claim 1, further comprising:

configuring a read timer and setting the read timer to a time period for a tolerable waiting time associated with the read commands;

after executing each write command, determining whether the read timer has reached the time period; and determining that the second condition is met when the read timer has reached the time period.

7. The method of claim 6, wherein the read timer notifies the processing unit that the read timer has reached the time period.

8. The method of claim 1, further comprising:

before executing each write command, determining whether any of the read commands for reading data from the same logical block address, into which the write command wants to program, is present in the read queue and an arrival time of the read command is earlier than that of the write command; and if so, the second condition is met.

9. The method of claim 1, further comprising:

the second condition is met when detecting that no write command is present in the write queue and at least one read command of the read queue is to be executed.

10. An apparatus for scheduling read and write commands, comprising:

a read queue;

a write queue;

an access interface; and a processing unit, coupled to the access interface, the read queue and the write queue, configuring a write timer and sets the write timer to a time period for a tolerable waiting time associated with write commands, obtaining more than one read commands from the read queue successively and executing the obtained read commands for reading data from a storage unit via the access interface until a first condition is met; after executing each read command, determining whether the write timer has reached the time period; determines that the first condition is met when the write timer has reached the time period; and, after the first condition is met, obtaining more than one of the write commands from the write queue successively and executing the obtained write commands for programming data into the storage unit via the access interface until a second condition is met.

11. The apparatus of claim 10, wherein the processing unit obtains the read commands and the write commands from a host device via the access interface; stores the read commands in the read queue in sequence with respect to their arrival times; and stores the write commands in the write queue in sequence with respect to their arrival times.

12. The apparatus of claim 10, wherein the write timer notifies the processing unit that the write timer has reached the time period.

13. The apparatus of claim 10, wherein the processing unit, before executing each read command, determines whether any of the write commands for programming data into the same logical block address, from which the read command wants to read out, is present in the write queue and an arrival time of the write command is earlier than that of the read command; and, if so, the first condition is met.

14. The apparatus of claim 10, wherein the first condition is met when the processing unit detects that no read command is present in the read queue and at least one write command of the write queue is to be executed.

15. The apparatus of claim 10, wherein the processing unit further configures a read timer and sets the read timer to a time period for a tolerable waiting time associated with the read commands; after executing each write command, determines whether the read timer has reached the time period; and determines that the second condition is met when the read timer has reached the time period.

16. The apparatus of claim 15, wherein the read timer notifies the processing unit that the read timer has reached the time period.

17. The apparatus of claim 10, wherein the processing unit, before executing each write command, determines whether any of the read commands for reading data from the same logical block address, into which the write command wants to program, is present in the read queue and an arrival time of the read command is earlier than that of the write command; and if so, the second condition is met.

18. The apparatus of claim 10, wherein the second condition is met when the processing unit detects that no write command is present in the write queue and at least one read command of the read queue is to be executed.

19. The apparatus of claim 10, wherein, before the first condition is met, an arrival time of any of the executed read commands is allowed to be later than an arrival time of any of the write commands of the write queue; and, before the second condition is met, an arrival time of any of the executed write commands is allowed to be later than an arrival time of any of the read commands of the read queue.

* * * * *